E. & G. E. ROWLAND.
FIRE-BARS FOR FURNACES.
No. 189,789. Patented April 17, 1877.
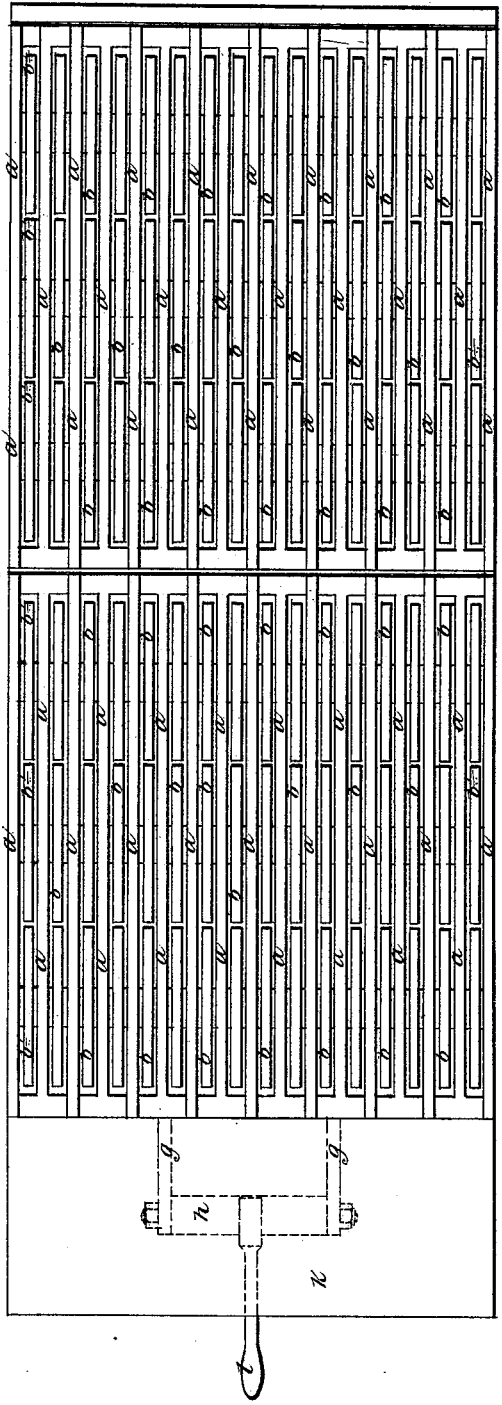
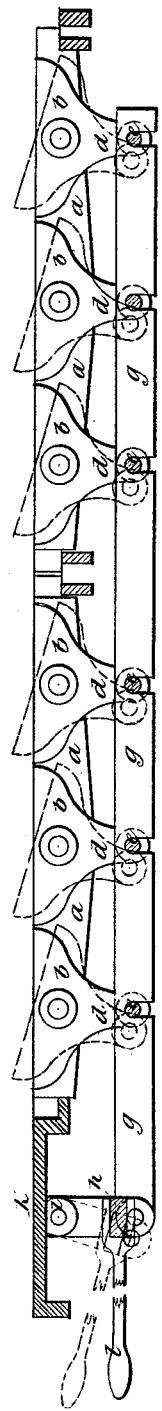
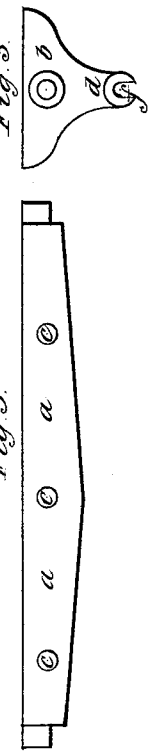

UNITED STATES PATENT OFFICE.

ELLIS ROWLAND AND GEORGE E. ROWLAND, OF MANCHESTER, ASSIGNORS OF ONE-HALF THEIR RIGHT TO ROBERT HARLOW, OF HEATON-NORRIS, ENGLAND.

IMPROVEMENT IN FIRE-BARS FOR FURNACES.

Specification forming part of Letters Patent No. 189,789, dated April 17, 1877; application filed September 20, 1876.

*To all whom it may concern:*

Be it known that we, ELLIS ROWLAND and GEORGE ETCHELLS ROWLAND, both of Manchester, in the county of Lancaster, Kingdom of Great Britain and Ireland, have invented certain Improvements in Fire-Bars for Furnaces, of which the following is a specification:

Our invention, for which we obtained English Letters Patent No. 1839, on the 21st day of May, 1873, relates to a novel form of movable or oscillating fire-bars for furnaces, and method of mounting the same, in combination with fixed fire-bars, as hereinafter described.

In carrying our invention into practical effect we place the fixed fire-bars a sufficient distance apart from one another to admit a series of our improved oscillating fire-bars to be mounted between each two fixed bars, the fixed bars being made with snugs on their sides, which act as fulcra for the oscillating fire-bars, which are made in short lengths, somewhat in the form of a bell-crank, having their horizontal arms mounted on a line, or nearly so, with the surface of the fixed bars, while their other or vertical arms extend downward into the ash-pit, where they are connected to a rod or rods, extending forward to the front, and provided with a handle or lever, by means of which the fireman can cause all the oscillating fire-bars to oscillate at once, and thus break up or prevent the formation of clinkers.

In the annexed drawing, Figure 1 is a plan view of a set of fire-bars constructed and arranged according to our invention, and Fig. 2 is a sectional elevation or side view of the same.

The grate is composed alternately of ordinary plain fire-bars *a a* and our improved oscillating fire-bars *b b*, but every alternate fixed bar is provided with snugs C C at each side, as seen in the detached views, Figs. 3 and 4, which snugs form the centers or fulcra upon which our improved oscillating bars are mounted, and are capable of being rocked or oscillated. The form of our improved oscillating fire-bars *b b* is seen clearly in Fig. 2, and detached at Fig. 5. The vertical arms *d* of all these oscillating fire-bars extend downward into the ash-pit, where each transverse row of such fire-bars are connected to transverse rods *e e*, which are supported in position by passing through holes formed in the arms of the outermost oscillating fire-bars *b'*, the arms of all the intermediate oscillating fire-bars being made with a "gab," *f*, as seen in Fig. 5, so as to drop onto such rod, and thus render them easy of removal.

The transverse rods *e e* are all connected together by the two notched bars *g g* being simply dropped upon them, as illustrated, and such notched bars are extended forward to the front of the furnace, where they are connected together by the cross-bar *h*, suspended from the bracket *i* on the under side of the dead-plate *k*. These oscillating fire-bars are all moved simultaneously by the movable key *l* being applied to the cross-bar *h*, and moved up and down, (the dotted lines showing the relative position of the oscillating fire-bars *b* with the key *l* when raised to its highest point,) and thus all the oscillating fire-bars are oscillated at once, and the clinkers either broken up or prevented being formed.

It will be readily apparent that by having the movable fire-bars in short lengths, and of the form hereinbefore described and illustrated, that the entire surface of the fire is more effectually broken up for the admission of air than when rocking fire-bars are used of greater length.

We wish it to be understood that we are aware that various kinds of rocking fire-bars have hitherto been used in furnaces, and, therefore, we make no claim to the rocking or oscillating action, except when produced by the method of mounting hereinbefore described and illustrated on the annexed drawing; and

We claim specially—

The combination of the bell-crank shaped oscillating fire-bars *b b* with the ordinary fixed fire-bars, carrying snugs C C, when mounted, operated, and arranged substantially as and for the purpose described.

ELLIS ROWLAND.
GEORGE ETCHELLS ROWLAND.

Witnesses:
JOHN J. ROYLE,
FREDERICK D. ASHWORTH.